B. HOLT.
TRACTION ENGINE.
APPLICATION FILED JULY 31, 1912.

1,194,738.

Patented Aug. 15, 1916.
2 SHEETS—SHEET 1.

WITNESSES:
Charles Pickles
R. S. Berry

INVENTOR
Benjamin Holt.
BY G. H. Strong.
ATTORNEY

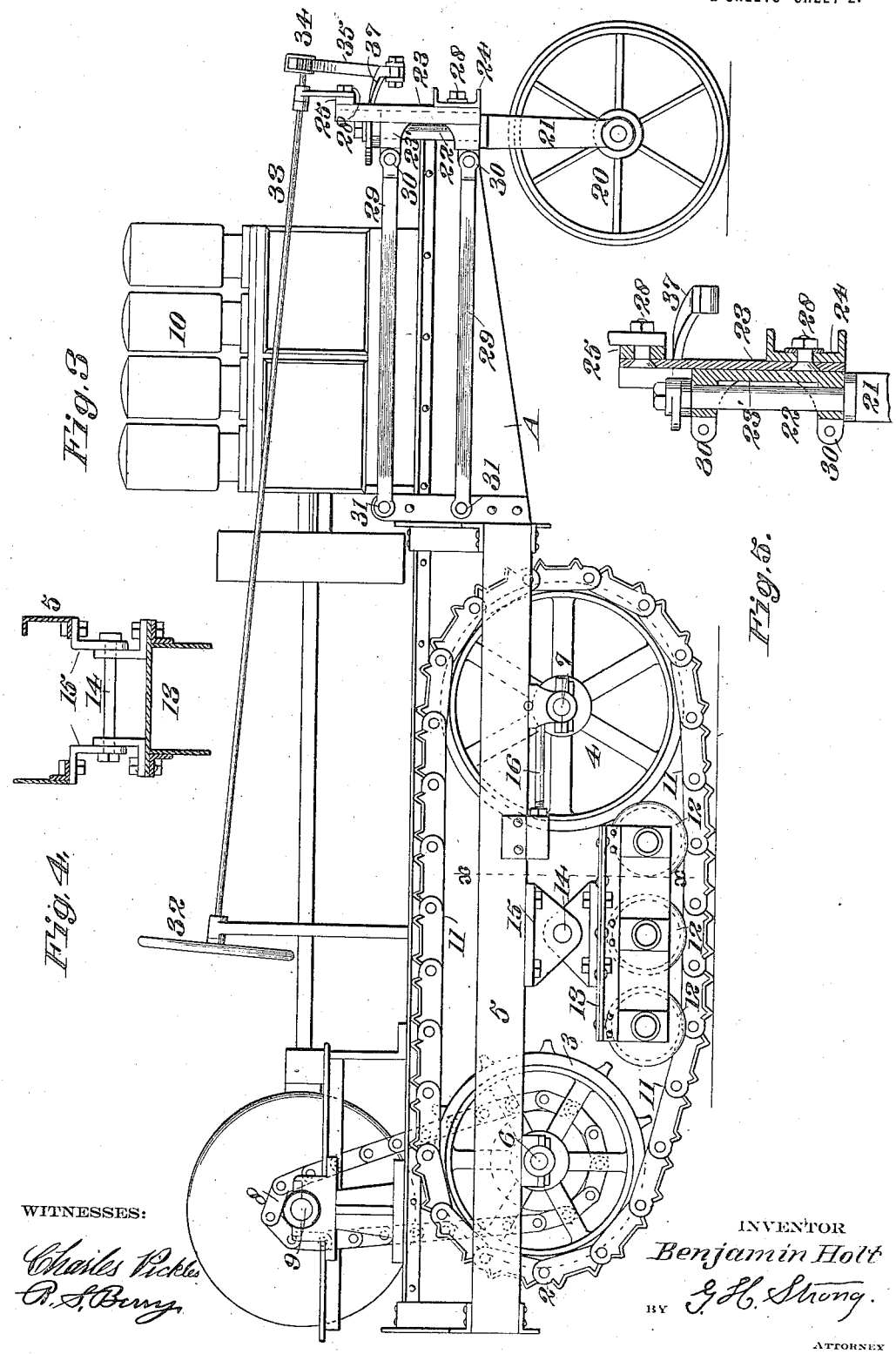

UNITED STATES PATENT OFFICE.

BENJAMIN HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTION-ENGINE.

1,194,738.   Specification of Letters Patent.   Patented Aug. 15, 1916.

Application filed July 31, 1912.   Serial No. 712,399.

*To all whom it may concern:*

Be it known that I, BENJAMIN HOLT, citizen of the United States, residing at Stockton, in the county of San Joaquin and State of California, have invented new and useful Improvements in Traction-Engines, of which the following is a specification.

This invention relates to traction engines of the type employing an endless, self-laying track, or flexible platform tread; these self-laying tracks being commonly employed in the Holt caterpillar tractors.

The particular object of the present invention is to provide a powerful, compact engine particularly adapted for use in vineyards where the space between the vines is usually so narrow that the engine should be arranged to straddle a row of vines; the cultivator or cultivators being attached so as to operate either on one side of the row, or simultaneously on both sides of the row straddled.

The tractor employing an endless flexible self-laying track is the only practical vehicle for use on cultivated ground of this sort, because the relatively large bearing surface of the self-laying track has a correspondingly minimum tendency to pack the soil; it being necessary to keep the soil as much as possible in a soft pulverulent condition. Inasmuch as the engine must straddle a row it renders it impracticable to use an ordinary single, centrally disposed front steering wheel. Also as vineyards are often laid out on hilly or undulating land, it is desirable that some provision be made to relieve the vehicle of its tendency to side-tilt as far as possible, and to accommodate it to the natural inequality of the ground traversed. Also it is necessary to have the engine frame so constructed to give the maximum amount of clearance underneath and free space between the wheels, so as not to injure the vines.

The invention consists of the parts and the combination and construction of parts as hereinafter more fully described and claimed, having reference to the accompanying drawings, in which—

Figure 1:
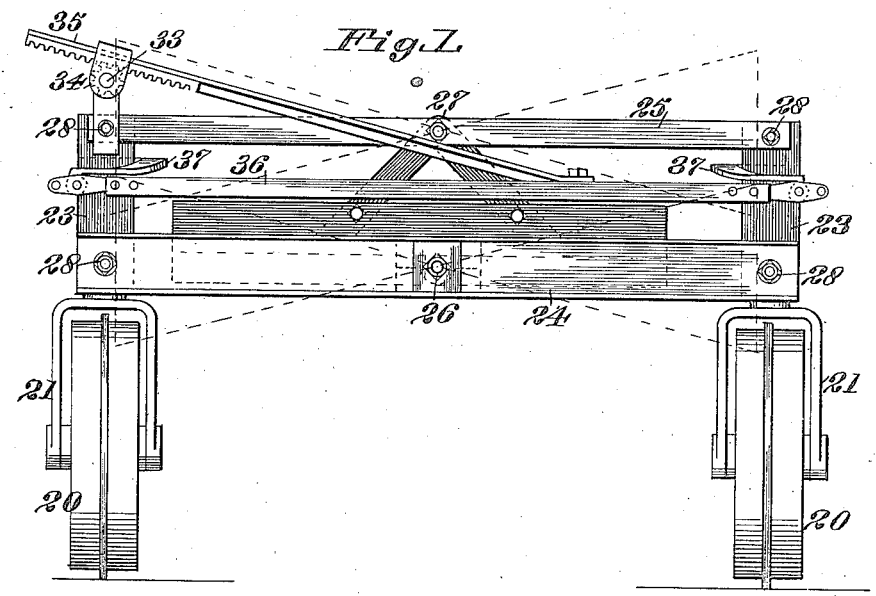
Figure 2:
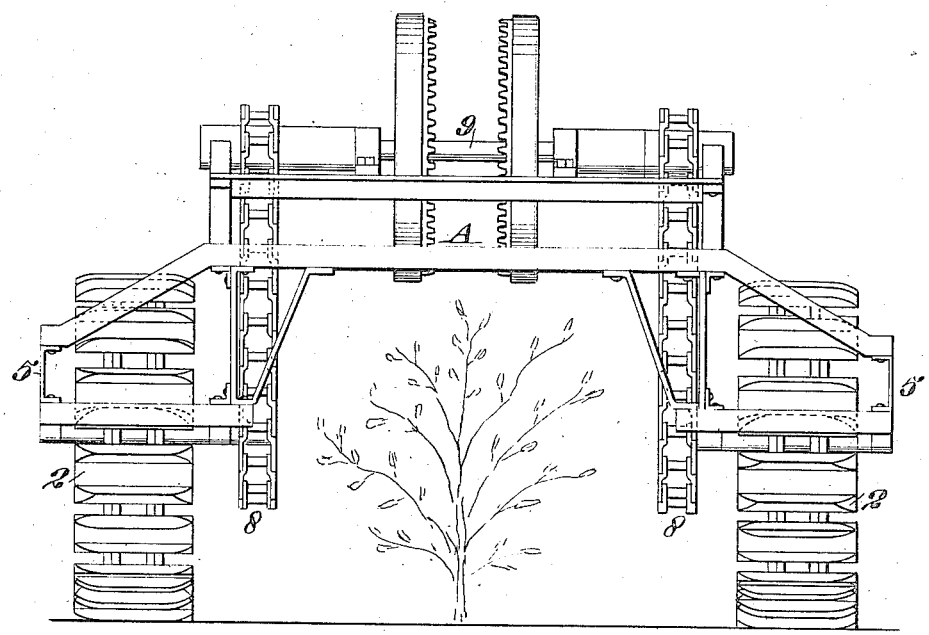

Figure 1 is a view of the front end. Fig. 2 is a view of the rear end. Fig. 3 is a side view. Fig. 4 is a cross section on line XX, Fig. 3. Fig. 5 is an enlarged vertical section of one of the steering heads.

A represents a frame of suitable construction, preferably of rolled, structural metal, designed to give maximum rigidity with minimum weight. In practice, it comprises two main longitudinal sills suitably braced and floored across to give the desired clearance beneath to accommodate the vines or shrubs. On this frame is mounted the usual motor and transmission for imparting motion to the traction belts. As here shown, these belts comprise each a series of conjoined links passing over a rear drive sprocket 3 and a front idler 4; each rear sprocket with its corresponding idler being journaled in a drop-frame 5 at each side of the main frame A. Each driver 3 and idler 4 has its respective shafts 6—7 journaled in this side frame 5, and each sprocket is independently driven by a chain 8 and shaft 9, which latter receives its power through suitable connections with the motor 10. The traction belts 2 are each provided with a continuous sectional trackway 11, on which the wheels 12 of the truck 13 run. In this type of engine each truck 13 is centrally pivoted at 14 on brackets 15, which depend from the side frame 5, so that the entire truck 13 has a limited oscillating movement, wholly independent of the wheels 3—4; it being understood that each truck is mounted entirely independent of, and has no connection with its companion truck on the opposite side of the machine. The operative face of each truck is normally in a plane below the level of the wheels 3—4, whereby the trucks carry the weight of the vehicle; the truck being guided in line with the machine, yet permitted to oscillate in a vertical plane freely about its pivot 14, by reason of the overlapping of the wheels 3—4, with the corresponding front and rear rollers 12 of the sprocket trucks; the rollers 12 being arranged in pairs. Take-up of slack from time to time in either of the belts is provided for by push-rods 16.

Truck 13 is rigid and is of sufficient length to be supported always on a plurality of links making up the belt 2, so that there is no tendency of the ground run of the belt to undulate and thereby form an uneven, humpy track as the machine travels over it. The space between the wheels 2—3, and the slack of the belt is sufficient to allow the truck and the portion of the belt on which it rests to rock in unison as it encounters obstructions or depressions in the course of travel. By this truck construction whereby the pivot-rods or bolts 14 are comparatively short and are contained entirely within the width of the belt and of the side frame 5, I am enabled to put my trucks 13 quite low, which is very essential to success, to support the load directly on the trucks, and yet at the same time I can raise the body of the engine frame indefinitely within practical limits, which has not been the case with any construction of engine, particularly of the type employing an endless flexible self-laying traction member, that I know of. In this type of high-bed traction engine, I employ a special form of steering mechanism, in which there are two steering wheels 20, one on each side of the machine, and arranged in line with the respective rear driving belts 2. Each wheel 20 is journaled between forks 21 of a standard 22, which latter is journaled in a suitable casting or box 23. Each box 23 is pivotally connected across the machine by two parallel bars 24—25; the lower bar 24 being in practice a heavy channel bar pivoted at its middle to the front end of frame A by a horizontal king-bolt 26. The principal weight of the front end of the engine comes on this king-bolt 26 and bar 24. The upper bar 25 is also centrally pivoted at 27, to a part of the engine frame vertically above the king-bolt 26. The pivotal connections of the bars 24—25 with the boxes 23 is indicated at 28. On the principle of a parallel ruler, it is thus seen that the wheels 20 may move simultaneously upward or downward in opposite directions, and yet they will always be maintained in vertical parallel planes, and in substantial alinement with the rear driving belts 2; and that they can partake of these movements without transmitting their up and down movements to the engine frame.

In order to give rigidity to the steering wheel supports, a pair of parallel rods 29 are disposed on each side of the engine; one pair being pivoted at suitably supported points as at 30 to a box 23 and the rear ends of the rods 29 being loosely pivoted at 31 at correspondingly spaced points to the engine frame.

The steering of the wheels 20 in unison is accomplished from the steersman's wheel 32 through rod 33, which carries the pinion 34 meshing a rack-bar 35, which pivotally connects with the cross-link 36, which latter is connected by the curved cranks 37 with a respective spindle 22.

Having thus described my invention what I claim and desire to secure by Letters Patent is—

1. In a traction engine, the combination of a main frame, a steering wheel supporting member pivotally connected between its ends to the main frame, and steering wheels pivotally mounted on the opposite ends of said supporting member, whereby the steering wheels may move up and down in substantially straight vertical lines independently of the main frame.

2. In a traction engine, the combination of a main frame, a steering wheel supporting member pivotally connected between its ends to the main frame, bearings pivotally mounted on the opposite ends of said supporting member, and steering wheels journaled on vertical axes in said bearings, the steering wheels being movable up and down in substantially straight vertical lines independently of the main frame and also movable on their individual axes.

3. In a traction engine, the combination of a main frame, a steering wheel supporting member pivotally connected between its ends to the main frame, bearings pivotally mounted on the opposite ends of said supporting member, steering wheels journaled on vertical axes in said bearings, and longitudinally extending bracing members pivotally connecting said bearings with the main frame.

4. In a traction engine, the combination of a main frame, a transverse supporting frame comprising an upper and a lower rod both pivotally connected between their ends and in a vertical line to the main frame, the lower rod constituting the main support for the main frame on the steering wheels, bearings pivotally mounted on the opposite ends of said supporting frame, and steering wheels journaled on vertical axes in said bearings.

5. In a traction engine, the combination with a frame, of a pair of steering wheels having vertical spindles, boxes in which the spindles are journaled, a pair of parallel bars pivotally connecting the boxes with the frame to maintain the wheels in parallel relation independent of their up and down movements, and means for connecting said spindles and for turning the wheels sidewise in unison.

6. In a traction engine, the combination with a frame, of a pair of steering wheels having vertical spindles, boxes in which the spindles are journaled, a pair of parallel bars pivotally connecting the boxes with the frame to maintain the wheels in parallel relation independent of their up and down movements, cranks on the spindles, a link connecting said cranks, and steering mechanism on the vehicle connected with said link for operating the steering wheels in unison.

In testimony whereof I have hereunto set my hand in the presence of two subscribing witnesses.

BENJAMIN HOLT.

Witnesses:
R. E. MANN,
THOS. BARNETT.